United States Patent
Chakraborty et al.

(10) Patent No.: US 9,490,629 B1
(45) Date of Patent: Nov. 8, 2016

(54) DC-TO-DC CONVERTER CONTROLLERS INCLUDING OVER-CURRENT PROTECTION, AND ASSOCIATED SYSTEMS AND METHODS

(71) Applicant: Volterra Semiconductor Corporation, Fremont, CA (US)

(72) Inventors: Sombuddha Chakraborty, Redwood City, CA (US); Luigi Panseri, Pleasanton, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 94 days.

(21) Appl. No.: 14/030,871

(22) Filed: Sep. 18, 2013

(51) Int. Cl.
*H02H 9/02* (2006.01)

(52) U.S. Cl.
CPC .................... *H02H 9/025* (2013.01)

(58) Field of Classification Search
CPC .................. H02M 1/32; H02M 1/40; H02M 2001/0009; H02M 3/156
See application file for complete search history.

(56) References Cited

U.S. PATENT DOCUMENTS

| | | | |
|---|---|---|---|
| 6,160,441 A | 12/2000 | Stratakos et al. | |
| 6,445,244 B1 | 9/2002 | Stratakos et al. | |
| 2007/0241725 A1* | 10/2007 | Ryu et al. | 323/222 |
| 2008/0067993 A1* | 3/2008 | Coleman | 323/282 |
| 2010/0308654 A1* | 12/2010 | Chen | H02M 3/1584 307/31 |

* cited by examiner

*Primary Examiner* — Jessica Han
*Assistant Examiner* — Bart Iliya
(74) *Attorney, Agent, or Firm* — Lathrop & Gage LLP

(57) ABSTRACT

A DC-to-DC converter includes a switching circuit, an energy storage inductor electrically coupled to the switching circuit, and a controller. The controller includes a control signal generator, a current sensing subsystem, an over-current detection subsystem, and filter logic. The control signal generator generates unfiltered control signals to control the switching circuit, and the current sensing subsystem senses current flowing through the energy storage inductor. The over-current detection subsystem asserts an over-current signal if a magnitude of positive current flowing through the energy storage inductor exceeds a maximum permissible value. The filter logic filters the unfiltered control signals to generate filtered control signals in response to assertion of the over-current signal, such that respective widths of one or more pulses of the filtered control signals are less than respective widths of corresponding pulses of the unfiltered control signals.

19 Claims, 6 Drawing Sheets

DC-TO-DC CONVERTER CONTROLLERS INCLUDING OVER-CURRENT PROTECTION, AND ASSOCIATED SYSTEMS AND METHODS

BACKGROUND

DC-to-DC converters are widely used in electronic devices. For example, many information technology devices include a DC-to-DC converter for converting bulk power from a battery, or from an off-line power supply, to a form suitable for powering a processor or other integrated circuit. Examples of DC-to-DC converters include, but are not limited to, buck-type DC-to-DC converters, boost-type DC-to-DC converters, and buck-boost type DC-to-DC converters.

It is often desirable to provide over-current protection in a DC-to-DC converter. For example, over-current protection may prevent DC-to-DC converter damage that would otherwise result from an over-current condition. As another example, over-current protection may promote safety, such as by reducing risk of fire associated with excessive converter or battery loading.

SUMMARY

In an embodiment, a DC-to-DC converter includes a switching circuit, an energy storage inductor electrically coupled to the switching circuit, and a controller. The controller includes a control signal generator, a current sensing subsystem, an over-current detection subsystem, and filter logic. The control signal generator is adapted to generate unfiltered control signals to control the switching circuit, and the current sensing subsystem is adapted to sense current flowing through the energy storage inductor. The over-current detection subsystem is adapted to assert an over-current signal if a magnitude of positive current flowing through the energy storage inductor exceeds a maximum permissible value. The filter logic is adapted to filter the unfiltered control signals to generate filtered control signals in response to assertion of the over-current signal, such that respective widths of one or more pulses of the filtered control signals are less than respective widths of corresponding pulses of the unfiltered control signals.

In an embodiment, a DC-to-DC converter includes a switching circuit, an energy storage inductor electrically coupled to the switching circuit, and a controller. The controller includes a control signal generator, a current sensing subsystem, an over-current detection subsystem, and filter logic. The control signal generator is adapted to generate unfiltered control signals to control the switching circuit, and the current sensing subsystem is adapted to sense current flowing through the energy storage inductor. The over-current detection subsystem is adapted to assert an over-current signal if a magnitude of current flowing through the energy storage inductor exceeds a maximum permissible value. The filter logic is adapted to filter the unfiltered control signals to generate filtered control signals in response to assertion of the over-current signal, such that filtered control signals include at least one pulse that is not present in the unfiltered control signals.

In an embodiment, a controller for a DC-to-DC converter includes a modulator adapted to generate unfiltered control signals for controlling a switching circuit of the DC-to-DC converter, a current sensing subsystem adapted to sense current flowing through an energy storage inductor of the DC-to-DC converter, an over-current detection subsystem, and filter logic. The over-current detection subsystem is adapted to assert an over-current signal if a magnitude of current flowing through the energy storage inductor exceeds a maximum permissible value. The filter logic is adapted to filter the unfiltered control signals to generate filtered control signals in response to assertion of the first over-current signal, such that respective widths of one or more pulses of the filtered control signals are less than respective widths of corresponding pulses of the unfiltered control signals.

In an embodiment, a method for providing over-current protection in a DC-to-DC converter includes the following steps: (a) generating unfiltered control signals to control a switching circuit of the DC-to-DC converter, (b) sensing current flowing through an energy storage inductor of the DC-to-DC converter, (c) determining whether a magnitude of current flowing through the energy storage inductor exceeds a maximum permissible value, (d) asserting an over-current signal if the magnitude of current flowing through the energy storage inductor exceeds the maximum permissible value, and (e) in response to assertion of the over-current signal, filtering the unfiltered control signals to generate filtered control signals such that respective widths of one or more pulses of the filtered control signals are less than respective widths of corresponding pulses of the unfiltered control signals.

In an embodiment, a method for providing over-current protection in a DC-to-DC converter includes the following steps: (a) generating unfiltered control signals to control a switching circuit of the DC-to-DC converter, (b) sensing current flowing through an energy storage inductor of the DC-to-DC converter, (c) determining whether a magnitude of current flowing through the energy storage inductor exceeds a maximum permissible value, (d) asserting an over-current signal if the magnitude of current flowing through the energy storage inductor exceeds the maximum permissible value, and (e) in response to assertion of the over-current signal, filtering the unfiltered control signals to generate filtered control signals such that the filtered control signals include at least one pulse that is not present in the unfiltered control signals.

DETAILED DESCRIPTION OF THE EMBODIMENTS

Figure 1:
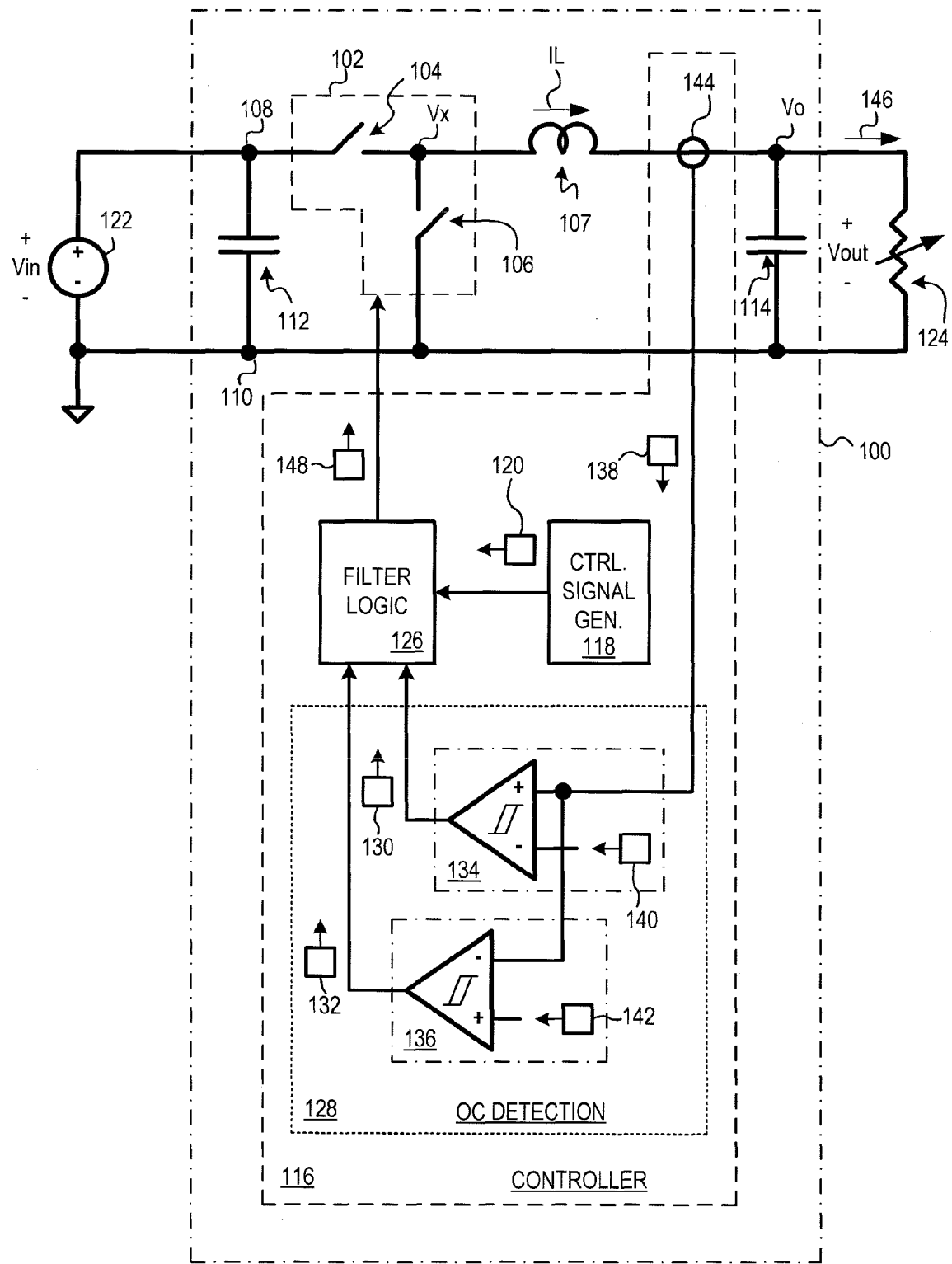
FIG. 1 illustrates a buck-type DC-to-DC converter including over-current protection, according to an embodiment.

Applicant has developed systems and methods for providing over-current protection in DC-to-DC converters. FIG. 1 illustrates a buck-type DC-to-DC converter 100 including over-current protection. Converter 100 includes a switching circuit 102 including a high side switching device 104 and a low side switching device 106 electrically coupled at a switching node Vx. Switching devices 104, 106, for example, are transistors. High side switching device 104 is electrically coupled between a positive input node 108 and switching node Vx, and low side switching device 106 is electrically coupled between a reference node 110 and switching node Vx. High side switching device 104 is a control switching device in that converter output voltage Vout is a function of the switching device's duty cycle. However, converter 100 could be modified such that the converter has an inverted buck-type topology where low side switching device 106 is the control switching device, without departing from the scope hereof.

An energy storage inductor 107 is electrically coupled between switching node Vx of switching circuit 102 and an output node Vo. DC-to-DC converter 100 further includes an input capacitor 112 and an output capacitor 114. Input capacitor 112 is electrically coupled between input and reference nodes 108, 110, and input capacitor 112 provides ripple current required by converter 100. Output capacitor 114 is electrically coupled between output node Vo and reference node 110, and output capacitor 114 filters ripple current generated by switching of switching circuit 102.

DC-to-DC converter 100 further includes a controller 116 including a control signal generator 118 adapted to generate unfiltered control signals 120 to control switching of switching circuit 102, such that switching circuit 102 repeatedly switches switching node Vx between positive node 108 and reference node 110, thereby switching node Vx between two different voltage levels, to transfer power from an input power source 122 to a load 124. Unfiltered control signals 120 are, for example, pulse width modulated (PWM) or pulse frequency modulated (PFM) signals, and switching circuit 102 typically switches node Vx between nodes 108, 110 at a frequency of at least 50 KHz. In some embodiments, control signal generator 118 controls switching circuit 102 to regulate one or more converter parameters, such as converter input voltage Vin, converter input current, converter input power, converter output voltage Vout, converter load current 146, and/or converter output power.

Controller 116 additionally includes current sensing subsystem 144, filter logic 126, and over-current detection subsystem 128. Current sensing subsystem 144 senses inductor current IL flowing through energy storage inductor 107 and generates an inductor current signal 138 proportional to inductor current IL. Thus, inductor current signal 138 represents load current 146 plus a ripple component from switching circuit 102 operation. Monitoring inductor current IL, instead of load current 146, for over-current protection helps limit the peak magnitude of inductor current IL, thereby reducing the likelihood of saturation of energy storage inductor 107, and associated over-current stress on switching devices 104, 106. In contrast, if load current 146 were instead monitored for over-current protection, current sensing subsystem 144 would only sense the average of inductor current IL, potentially allowing for inductor current IL to reach an excessively high peak value and cause energy storage inductor 107 to saturate, before over-protection.

In some embodiments, current sensing subsystem 144 includes a sensing element, such as a current sensing resistor, electrically coupled in series with energy storage inductor 107. In some other embodiments, current sensing subsystem 144 senses inductor current IL using non-dissipative techniques, such as by measuring voltage drop across parasitic resistance of energy storage inductor 107. Furthermore, in yet other embodiments, current sensing subsystem 144 indirectly senses inductor current IL from current flowing through portions of DC-to-DC converter 100, such as from current flowing through switching device 104 and/or through switching device 106. For example, in a particular embodiment, current sensing subsystem 144 employs systems and methods disclosed in one or more of U.S. Pat. Nos. 6,160,441 and 6,445,244 to Stratakos et al., each of which is incorporated herein by reference, to generate current signal 138 based on current flowing through switching devices 104, 106. In some alternate embodiments, current sensing subsystem 144 is separate from controller 116.

Inductor current IL is considered to be "positive" when flowing through energy storage inductor 107 from left to right, or in other words, when flowing through the inductor from switching node Vx to output node Vo. Conversely, inductor current IL is considered to be "negative" when flowing through energy storage inductor 107 from right to left, or in other words, when flowing through the inductor from output node Vo to switching node Vx. Over-current detection subsystem 128 detects excessive magnitude of both positive and negative current IL. Accordingly, inductor current signal 138 indicates both magnitude and polarity (i.e., positive or negative) of inductor current IL. Over-current detection subsystem 128 asserts a first over-current signal 130 if a magnitude of positive current flowing through energy storage inductor 107 exceeds a first maximum permissible value, and the subsystem asserts a second over-current signal 132 if a magnitude of negative current flowing through energy storage inductor 107 exceeds a second maximum permissible value. In some embodiments, the first and second maximum permissible values have the same magnitude to achieve symmetric over-current protection, while in other embodiments, the first and second maximum permissible values have different magnitudes to achieve asymmetric over-current protection.

Over-current detection subsystem 128 includes a first comparison subsystem 134 and a second comparison subsystem 136, which respectively detect excessive magnitude of positive and negative inductor current IL. Specifically, first comparison subsystem 134 compares inductor current signal 138 to a first reference 140, and first comparison subsystem 134 asserts first over-current signal 130 if inductor current signal 138 exceeds first reference 140. Second comparison subsystem 136 compares inductor current signal 138 to a second reference 142, and second comparison subsystem 136 asserts second over-current signal 132 if negative reference 142 exceeds inductor current signal 138. Thus, the first and second maximum permissible values are set, in part, by the values of first reference 140 and second reference 142, respectively. In some embodiments, first comparison subsystem 134 and second comparison subsystem 136 each include hysteresis, as symbolically shown in FIG. 1, to prevent oscillation of first over-current signal 130 and second over-current signal 132, respectively, between their asserted and non-asserted states.

Filter logic 126 filters unfiltered controls signals 120 to generate filtered control signals 148, which are coupled to switching circuit 102 to control switching devices 104, 106. During normal operation, filter logic 126 does not modify the control signals, such that filtered control signals 148 are the same as unfiltered control signals 120. Thus, during normal operation, control signal generator 118 controls switching circuit 102 without intervention by filter logic 126. However, during an over-current condition, filter logic 126 modifies unfiltered control signals 120 to mitigate the over-current condition, such that filtered control signals 148 differ from unfiltered control signals 120. Specifically, in response to assertion of first over-current signal 130, filter logic 126 modifies unfiltered control signals 120 to prematurely terminate control switching device 104 conduction during the current switching cycle, thereby preventing inductor current IL from further increasing. In response to assertion of second over-current signal 132, in contrast, filter logic 126 modifies unfiltered control signals 120 such that control device 104 turns on, i.e., changes from its non-conductive to its conductive state, during the current switching cycle, thereby preventing inductor current IL from becoming further negative.

In some embodiments, filter logic 126 is adapted to cause control switching device 104 to operate in its conductive state for a predetermined fixed amount of time, or for a minimum amount of time, in response to assertion of second over-current signal 132, to limit converter 100's maximum switching frequency during a negative over-current condition. In these embodiments, filter logic 126 is optionally further adapted to cause control switching device 104 to remain in its non-conductive state for a minimum amount of time after the switching device turns off, i.e., after control switching device 104 switches from its conductive state to its non-conductive state, to prevent insufficient conduction time of low side switching device 106.

Figure 2:
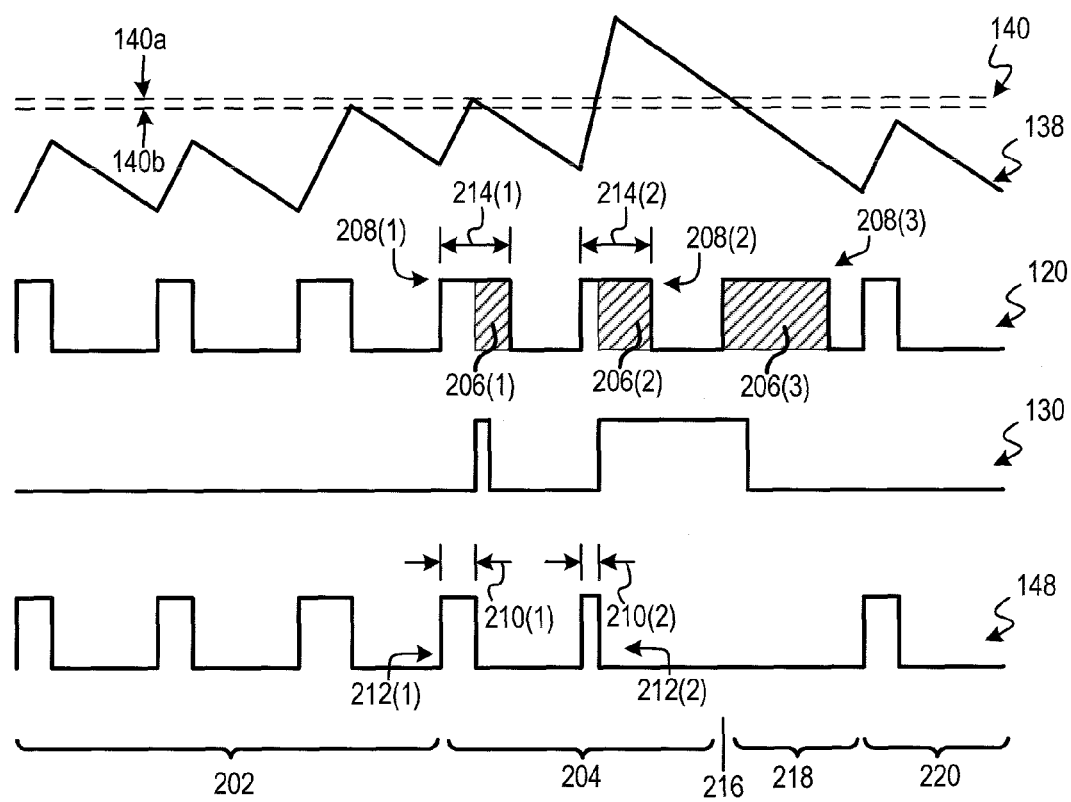
FIG. 2 shows signals of the FIG. 1 DC-to-DC converter illustrating one example of positive over-current protection.

FIG. 2 shows signals of DC-to-DC converter 100 illustrating one example of positive over-current protection. FIG. 2 includes inductor current signal 138, first reference 140, unfiltered control signals 120, first over-current signal 130, and filtered control signals 148. Control switching device 104 operates in its conductive state for the duration of each pulse of filtered control signals 148.

During time period 202, inductor current signal 138 is less than first reference 140, and filter logic 126 therefore does not modify the control signals. Accordingly, filtered controlled signals 148 are the same as unfiltered control signals 120 during time period 202. During time period 204, however, inductor current signal 138 twice reaches first reference 140, causing corresponding assertion of first over-current signal 130. Each time first over-current signal 130 is asserted, filter logic 126 terminates the control signal pulse for the remainder of the current switching cycle, such that cross-hatched portions 206 of unfiltered control signal pulses 208 are not present in filtered control signal 148. Thus, widths 210 of pulses 212 of filtered control signals 148 are less than widths 214 of corresponding pulses 208 of unfiltered control signals 120, thereby limiting control switching device 104 conduction and inductor current IL peak magnitude.

In severe over-current conditions where inductor current signal 138 exceeds first reference 140 at the beginning of a switching cycle, first over-current signal 130 is asserted at the beginning of the switching cycle, thereby causing an unfiltered control signal pulse 208 associated with the switching cycle to be completely omitted from filtered control signals 148. For example, inductor current signal 138 remains above first reference 140 at the start of a switching cycle at time 216, such that filter logic 126 completely eliminates pulse 208(3) from filtered control signals 148. Thus, filtered control signals 148 do not include any pulses during time period 218. During time period 220, inductor current signal 138 remains below first reference 140, and filter logic 126 therefore does not modify the control signals.

Although not required, first reference 140 typically includes separate upper and low threshold values to achieve hysteresis, thereby helping prevent oscillation of first over-current signal 130 between its asserted and non-asserted states. For instance, in the FIG. 2 example, first reference 140 has an upper threshold 140a and lower threshold 140b, where upper threshold 140a is greater than lower threshold 140b. First comparison subsystem 134 asserts first over-current signal 130 if inductor current signal 138 exceeds upper threshold 140a, and first comparison subsystem 134 de-asserts first over-current signal 130 if inductor current signal 138 falls below lower threshold 140b, thereby achieving hysteresis.

Figure 3:
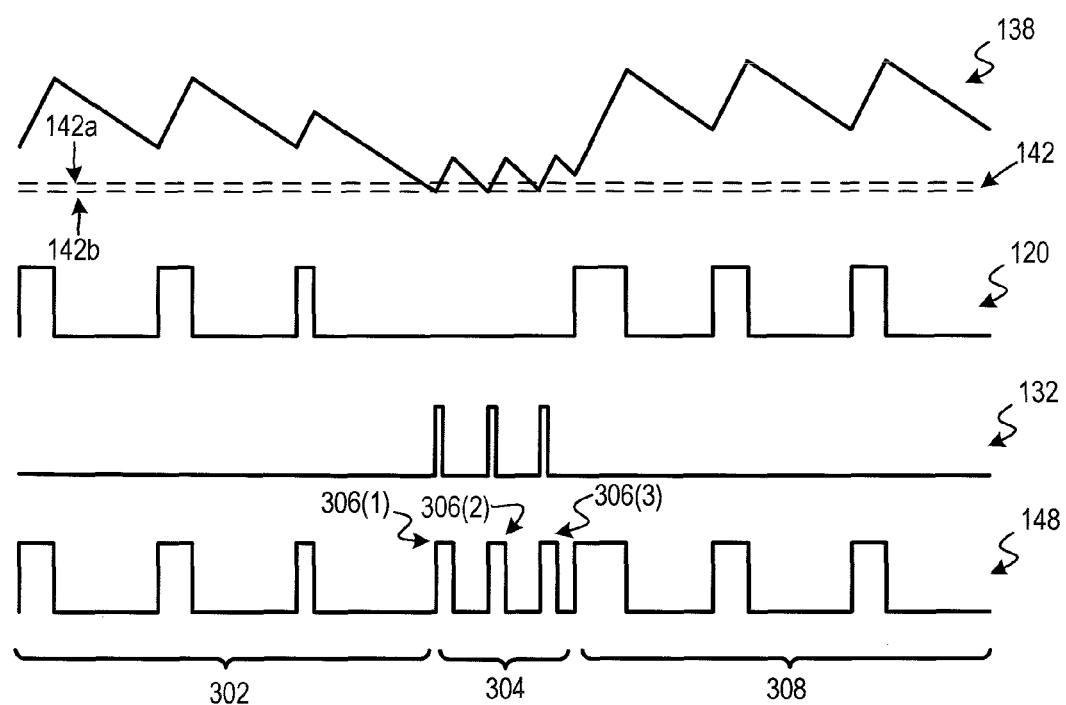
FIG. 3 shows signals of the FIG. 1 DC-to-DC converter illustrating one example of negative over-current protection.

FIG. 3 shows signals of DC-to-DC converter 100 illustrating one example of negative over-current protection. FIG. 3 includes inductor current signal 138, second reference 142, unfiltered control signals 120, second over-current signal 132, and filtered control signals 148. During time period 302, inductor current signal 138 exceeds second reference 142, and second over-current signal 132 is therefore not asserted. Accordingly, filtered control signals 148 are the same as unfiltered control signals 120 during time period 302. During time period 304, however, inductor current signal 138 falls to second reference 142 three times, causing corresponding assertion of second over-current signal 132. Filter logic 126 adds a pulse 306 to the control signals in response to each assertion of negative over-current signal 132, thereby causing control switching device 104 to turn on and prevent inductor current IL from becoming more negative, thereby limiting peak magnitude of inductor current IL. Thus, filtered control signals 148 include pulses 306 which are not present in unfiltered control signals 120. During time period 308, inductor current signal 138 is well above second reference 142, such that second over-current signal 132 is not asserted, and filtered control signals 148 are the same as unfiltered control signals 120.

Although not required, second reference 142 typically includes separate upper and low threshold values to achieve hysteresis, in a manner similar to that of first reference 140, thereby helping prevent oscillation of second over-current signal 132 between its asserted and non-asserted states. For instance, in the FIG. 3 example, second reference 142 has an upper threshold 142a and a lower threshold 142b, where upper threshold 142a is greater than lower threshold 142b. Second comparison subsystem 136 asserts second over-current signal 132 if inductor current signal 138 falls to lower threshold 142b, and second comparison subsystem 136 de-asserts second over-current signal 132 if inductor current signal 138 rises above upper threshold 142a, thereby achieving hysteresis.

The polarity of signals of converter 100 could be changed without departing from the scope hereof. For example, although pulses of filtered and unfiltered control signals 120, 148 are shown as being positive pulses in FIGS. 2 and 3, controller 116 could be modified such that pulses of these signals are negative pulses, without departing from the scope hereof. As another example, although current sensing subsystem 144 is configured in FIG. 1 such that inductor current signal 138 has a polarity corresponding to that of current IL, current sensing subsystem 144 could be modified such that polarity of inductor current signal 138 is inverted, with appropriate changes to first and second comparison subsystems 134, 136.

Converter 100 could be modified to have only either positive or negative over-current protection, instead of both positive and negative over-current protection. For example, in an alternative embodiment, second comparison subsystem 136 is omitted, such that DC-to-DC converter 100 has only positive over-current protection. In this alternate embodiment, current sensing subsystem 144 is optionally simplified to sense only positive current IL. Furthermore, DC-to-DC converter 100 could be modified to be a multi-phase converter, with controller 116 partially or completely replicated in each phase. Moreover, converter 100 could be modified to have a different topology, such as a boost-type topology, instead of a buck-type topology.

Figure 4:
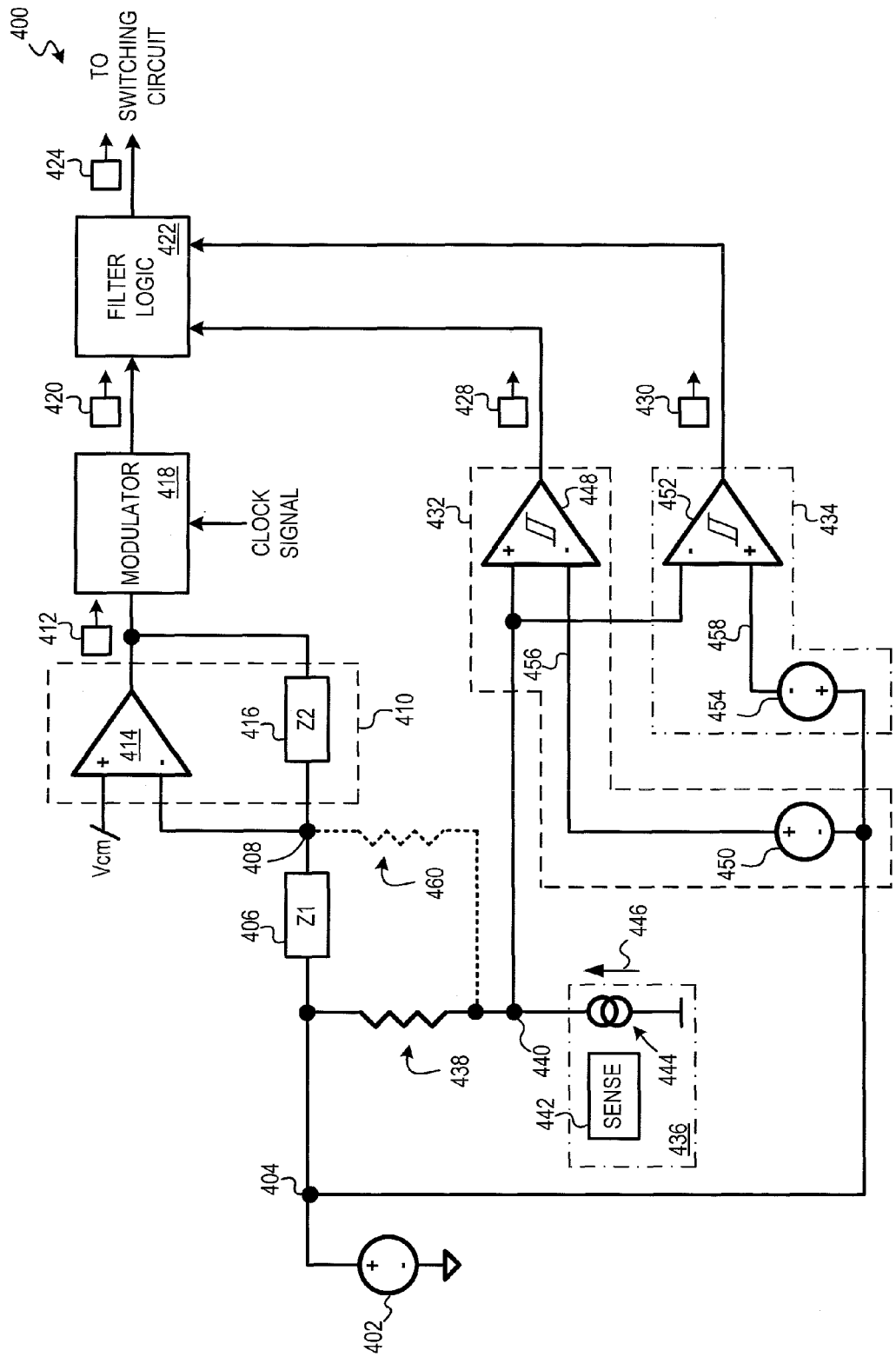
FIG. 4 shows a DC-to-DC converter controller, which is one possible implementation of a controller of the FIG. 1 DC-to-DC converter.

FIG. 4 shows a DC-to-DC converter controller 400, which is one possible implementation of controller 116. It should be appreciated, however, that controller 116 could be implemented in other manners without departing from the scope hereof. Additionally, controller 400 could be used in applications other than that of converter 400.

Controller 400 includes error circuitry 402 which sets a voltage at an error node 404 as a function of a difference between an actual output voltage of the DC-to-DC converter and a desired output voltage of the DC-to-DC converter. A first impedance network 406 is electrically coupled between error node 404 and an integration node 408. An integration subsystem 410 integrates current flowing through first impedance network 406 to generate a modulator control signal 412. In one embodiment, integration subsystem 410 includes an amplifier 414 and a second impedance network 416. Amplifier 414 amplifies a difference between a common mode voltage Vcm and a voltage at integration node 408. Common mode voltage Vcm is a voltage between the positive and negative power supply rails (not shown) of amplifier 414. In some embodiments, Vcm is approximately halfway between the positive and negative power supply rails. A modulator 418 generates unfiltered control signals 420, which are analogous to unfiltered control signals 120 of FIG. 1, based on at least modulator control signal 412 and a clock signal.

Accordingly, error circuitry 402, first impedance network 406, integration subsystem 410, and modulator 418 collectively form a control signal generator analogous to control signal generator 118 of FIG. 1. Controller 400 exhibits voltage mode control when used in a DC-to-DC converter.

Controller 400 additionally includes filter logic 422, which filters unfiltered control signals 420 to generate filtered control signals 424. Filter logic 422 filters unfiltered control signals 420 in response to assertion of a first over-current signal 428 or a second over-current signal 430, in the same manner that filter logic 126 of FIG. 1 filters unfiltered control signals 120 in response to assertion of over-current signals 130, 132. Filtered control signals 424 are communicatively coupled to a switching circuit, such as switching circuit 102 when controller 400 is used with converter 100.

Controller 400 further includes an over-current detection subsystem including a first comparison subsystem 432, a second comparison subsystem 434, a current sensing subsystem 436, and a resistive device 438. This over-current detection subsystem, which is analogous to over-current detection subsystem 128 of FIG. 1, asserts first over-current signal 428 in response to a positive over-current condition and second over-current signal 430 in response to a negative over-current condition.

Resistive device 438 is electrically coupled between error node 404 and a current feedback node 440. Resistive device 438 is either a resistor, as shown, or an electronic device emulating a resistor. Although resistive device 438 is symbolically shown as a single element, it could include multiple elements, such as a plurality of series and/or parallel coupled resistors. Current sensing subsystem 436 includes a current sensing circuitry 442 and a current source 444 electrically coupled to current feedback node 440. Current sensing circuitry 442 senses current flowing through an energy storage inductor of the DC-to-DC converter, and current sensing circuitry 442 causes current source 444 to inject into current feedback node 440 a current signal 446 proportional to the current flowing through the energy storage inductor. For example, in applications where controller 400 is used in DC-to-DC converter 100 of FIG. 1, current signal 446 is proportional to inductor current IL flowing through energy storage inductor 107. Accordingly, voltage at current feedback node 440 is proportional to the current flowing through the DC-to-DC converter's energy storage inductor.

First comparison subsystem 432 includes a first comparator 448 and a first voltage source 450, and second comparison subsystem 434 includes a second comparator 452 and a second voltage source 454. First voltage source 450 is electrically coupled between a first reference node 456 and error node 404, and second voltage source 454 is electrically coupled between a second reference node 458 and error node 404. First comparator 448 asserts first over-current signal 428 if a voltage at current feedback node 440 meets a first threshold criterion, namely that the voltage at current feedback node 440 exceeds a voltage at first reference node 456. Second comparator 452 asserts second over-current signal 430 if the voltage at current feedback node 440 meets a second threshold criterion, namely that the voltage at current feedback node 440 is less than the voltage at second reference node 458, or in other words, the voltage at second reference node 458 exceeds the voltage at current feedback node 440. The first and second over-current thresholds are set, in part, by a resistance value of resistive device 438, since voltage at current feedback node 440 is proportional to the resistance value of resistive device 438. The first and second over-current thresholds are also partially set by the values of first voltage source 450 and second voltage source 454, respectively. In some embodiments, first voltage source 450 and second voltage source 454 each have upper and lower threshold values such that first comparison subsystem 432 and second comparison subsystem 434 achieve hysteresis, as symbolically shown in FIG. 4, in a manner similar to that discussed above with respect to FIGS. 2 and 3.

The voltages compared by comparators 448, 452 are referenced to error node 404, instead of to ground. Such configuration reduces susceptibility of controller 400 to erroneous operation from a ground offset between controller 400 and its associated switching circuit.

Controller 400 is adapted to maintain the DC-to-DC converter's output voltage at the desired value substantially independent of load current. In some applications, however, it is desired that the DC-to-DC converter exhibit "droop," such that converter effectively has an output impedance which causes the output voltage to drop in proportion to load current. As known in the art, voltage converter droop may facilitate maintaining a desired output voltage range during dynamic loading conditions.

If droop is desired, resistive device 438 may be replaced by resistive device 460, shown in dashed lines, where resistive device 460 is electrically coupled between integration node 408 and current feedback node 440. Although resistive device 460 is symbolically shown as a single element, it could include multiple elements, such as a plurality of series and/or parallel coupled resistors. Use of resistive device 460 in place of resistive device 438 causes output voltage to drop in proportion to load current, where the converter's effective output impedance is proportional to sum of the resistance of resistive device 460 and the real component of first impedance network 406. Such configuration also causes controller 400 to exhibit average current mode control, instead of voltage mode control. Furthermore, use of resistive device 460 in place of resistive device 438 causes the positive and negative over-current thresholds to be a function of the sum of resistive device 460's resistance value and the real component of first impedance network 406. Thus, both converter droop and over-current protection thresholds can be set from the resistance value of resistive device 460.

Current mode control could alternately be obtained using both resistive device 438 and resistive device 460 in controller 400. Such alternate embodiment causes the converter to exhibit droop, where the converter's effective output impedance and current mode control characteristics are a function of the resistance value of resistive device 438, the resistance value of resistive device 460, and the real component of first impedance network 406. For example, minimal droop can be achieved if the resistance value of resistive device 460 is much greater than that of resistive device 438. However, if the resistance value of resistive device 460 is much greater than that of resistive device 438, the DC-to-DC converter will have relatively insignificant current feedback, and the DC-to-DC converter may not exhibit stability benefits associated with current mode control.

Controller 400 could be modified to provide only positive over-current protection or only negative over-current protection, instead of both positive and negative over-current protection. For example, second comparison subsystem 434 could be omitted if negative over-current protection is not required. Additionally, filter logic 422 could potentially be simplified if only one polarity of over-current protection is required.

The polarity of signals of controller 400 could be changed without departing from the scope hereof. For example, current sensing subsystem 436 could be modified such that polarity of current signal 446 is reversed. In such case, comparison subsystems 432, 434 would need to be modified to have different respective threshold criterion for asserting their respective over-current signals. Specifically, first comparison subsystem 432 would need to be modified to assert first over-current signal 428 if the voltage at current feedback node 440 was less than a voltage at first reference node 456, and second comparison subsystem 434 would need to be modified to assert second over-current signal 430 if the voltage at current feedback node 440 exceeded a voltage at second reference node 458.

As another example, the inverted and non-inverted inputs of first comparator 448 could be swapped, such that assertion of first over-current signal 428 corresponds to the output of first comparator 448 going low. In such case, filter logic 422 would need to be modified to accommodate the polarity change of first over-signal 428.

Controller 400 is implemented, for example, by a combination of digital and analog circuitry. In some embodiments, controller 400 is partially implemented by a processor executing instructions in the form of software or firmware. In some embodiments, all controller 400 components, with the exception of impedance networks 406, 416 and resistive devices 438, 460 are packaged in a single integrated circuit package. However, the components of controller 400 could combined and packaged in various other manners without departing from the scope hereof. For example, in one alternate embodiment, modulator 418 and filter logic 422 are combined into a single subsystem.

Figure 5:
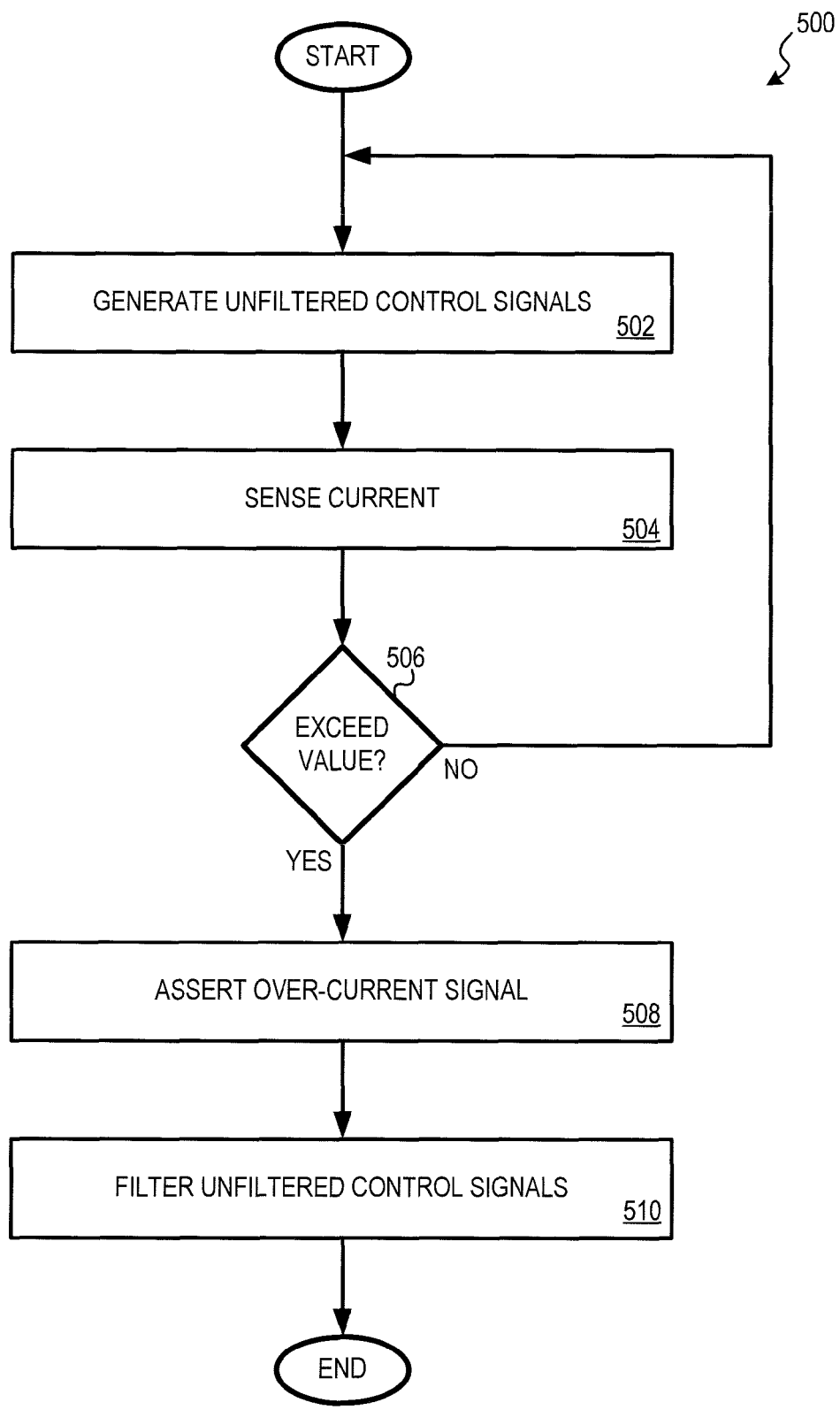
FIG. 5 shows one method for providing positive over-current protection in a DC-to-DC converter, according to an embodiment.

FIG. 5 shows one method 500 for providing positive over-current protection in a DC-to-DC converter. In step 502, unfiltered control signals are generated to control a switching circuit of the DC-to-DC converter. In one example of step 502, control signal generator 118 of converter 100 generates unfiltered control signals 120 for controlling switching circuit 102 (see FIG. 1). In step 504, current flowing through an energy storage inductor of the DC-to-DC converter is sensed. In one example of step 504, current sensing subsystem 144 senses inductor current IL flowing through energy storage inductor 107 and generates inductor current signal 138 proportional to inductor current IL. Decision step 506 determines whether a magnitude of the current flowing through the energy storage inductor storage inductor exceeds a maximum permissible value. If so, method 500 continues to step 508 where an over-current signal is asserted; otherwise, method 500 returns to step 502. In one example of steps 506 and 508, first comparison subsystem 134 determines that inductor current signal 138 exceeds first reference 140, and first comparison subsystem 134 asserts first over-signal 130 in response.

In step 510, the unfiltered control signals are filtered to generate filtered control signals in response to the over-current signal, such that respective widths of one or more pulses of the filtered control signals are less than respective widths of corresponding pulses of the unfiltered control signals. In one example of step 510, filter logic 126 generates filtered control signals 148 from unfiltered control signals 120, in response to assertion of first over-current signal 130, such that widths 210 of pulses 212 are less than widths 214 of corresponding pulses 208 (see FIG. 2).

Figure 6:
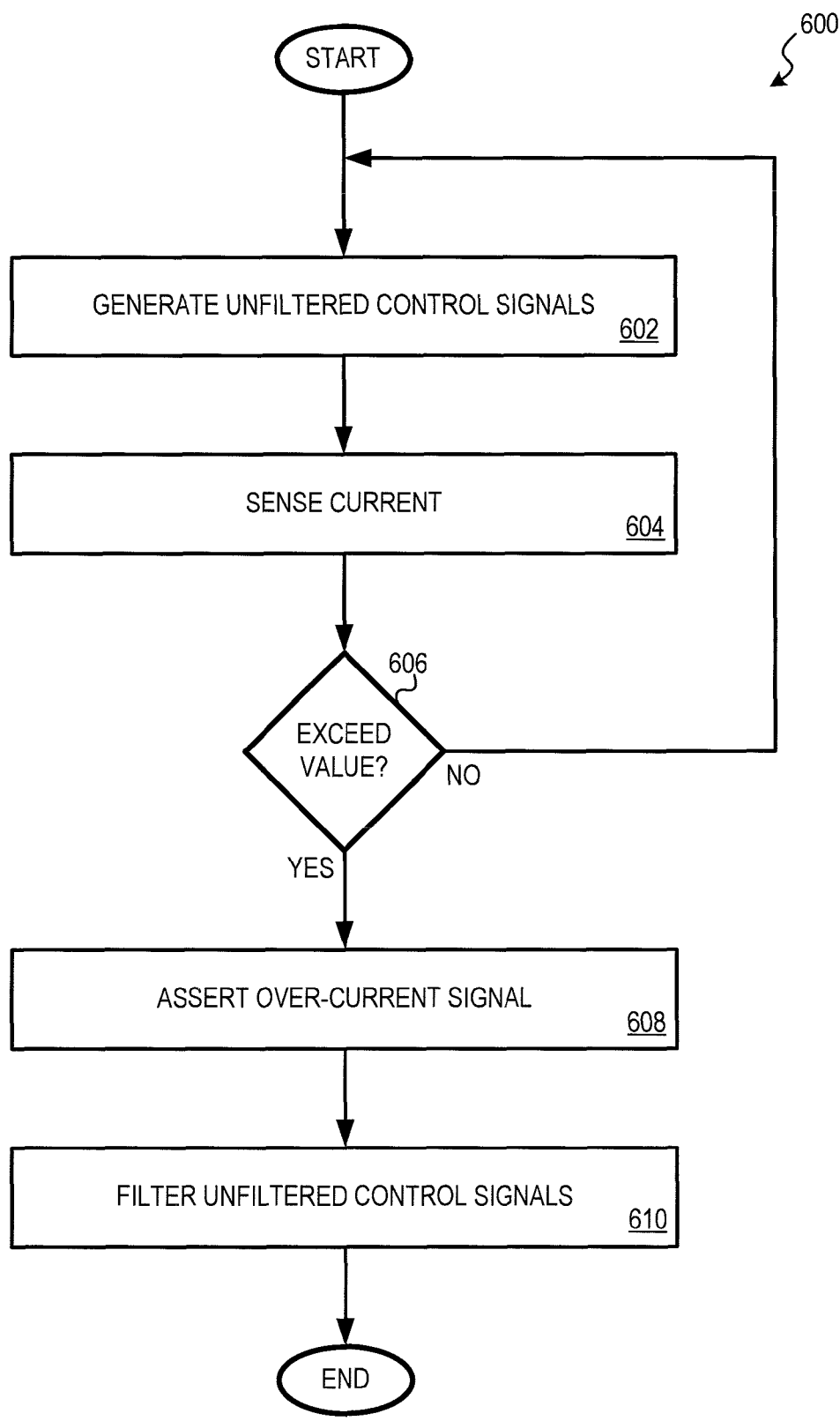
FIG. 6 shows one method for providing negative over-current protection in a DC-to-DC converter, according to an embodiment.

FIG. 6 shows one method 600 for providing negative over-current protection in a DC-to-DC converter. In step 602, unfiltered control signals are generated to control a switching circuit of the DC-to-DC converter. In one example of step 602, control signal generator 118 of converter 100 generates unfiltered control signals 120 for controlling switching circuit 102 (see FIG. 1). In step 604, current flowing through an energy storage inductor of the DC-to-DC converter is sensed. In one example of step 604, current sensing subsystem 144 senses inductor current IL flowing through energy storage inductor 107 and generates inductor current signal 138 proportional to inductor current IL. Decision step 606 determines whether a magnitude of the current flowing through the energy storage inductor storage inductor exceeds a maximum permissible value. If so, method 600 continues to step 608 where an over-current signal is asserted; otherwise, method 600 returns to step 602. In one example of steps 606 and 608, second comparison subsystem 136 determines that second reference 142 exceeds inductor current signal 138, and second comparison subsystem 136 asserts second over-signal 132 in response.

In step 610, the unfiltered control signals are filtered to generate filtered control signals in response to assertion of the over-current signal, such that the filtered control signals include at least one pulse that is not present in the unfiltered control signals. In one example of step 608, filter logic 126 generates filtered control signals 148 from unfiltered control signals 120, in response to assertion of second over-current signal 132, such that filtered control signals 148 include pulses 306 that are not present in unfiltered control signals 120 (see FIG. 3).

Combinations of Features

Features described above as well as those claimed below may be combined in various ways without departing from the scope hereof. The following examples illustrate some possible combinations:

(A1) A DC-to-DC converter may include a switching circuit, an energy storage inductor electrically coupled to the switching circuit, and a controller. The controller may include (a) a control signal generator adapted to generate unfiltered control signals to control the switching circuit, (b) a current sensing subsystem adapted to sense current flowing through the energy storage inductor, (c) an over-current detection subsystem adapted to assert a first over-current signal if a magnitude of positive current flowing through the energy storage inductor exceeds a first maximum permissible value, and (d) filter logic adapted to filter the unfiltered control signals to generate filtered control signals in response to assertion of the first over-current signal, such that respective widths of one or more pulses of the filtered control signals are less than respective widths of corresponding pulses of the unfiltered control signals.

(A2) In the DC-to-DC converter denoted as (A1), the control signal generator may include (a) error circuitry adapted to set a voltage at an error node as a function of a difference between an actual output voltage of the DC-to-DC converter and a desired output voltage of the DC-to-DC converter, (b) an impedance network electrically coupled between the error node and an integration node, (c) an integration subsystem adapted to integrate current flowing through the impedance network to generate a modulator control signal, and (d) a modulator adapted to generate the unfiltered control signals from at least the modulator control signal.

(A3) In the DC-to-DC converter denoted as (A2): the current sensing subsystem may include a current source adapted to inject into a current feedback node a current signal proportional to the current flowing through the energy storage inductor; and the over-current detection subsystem may include (a) one or more resistive devices electrically coupled between the integration node and the current feedback node, and (b) a first comparison subsystem adapted to assert the first over-current signal if a voltage at the current feedback node meets a first threshold criterion.

(A4) In the DC-to-DC converter denoted as (A3), the first comparison subsystem may include (a) a first voltage source electrically coupled between the error node and a first reference node, and (b) a first comparator adapted to assert the first over-current signal if a voltage at the current feedback node exceeds a voltage at the first reference node.

(A5) In the DC-to-DC converter denoted as (A2): the current sensing subsystem may include a current source adapted to inject into a current feedback node a current signal proportional to the current flowing through the energy storage inductor; and the over-current detection subsystem may include (a) one or more resistive devices electrically coupled between the error node and the current feedback node, and (b) a first comparison subsystem adapted to assert the first over-current signal if a voltage at the current feedback node meets a first threshold criterion.

(A6) In the DC-to-DC converter denoted as (A5), the first comparison subsystem may include (a) a first voltage source electrically coupled between the error node and a first reference node, and (b) a first comparator adapted to assert the first over-current signal if a voltage at the current feedback node exceeds a voltage at the first reference node.

(A7) In the DC-to-DC converters denoted as (A1), (a) the over-current detection subsystem may be further adapted to assert a second over-current signal if a magnitude of negative current flowing through the energy storage inductor exceeds a second maximum permissible value, and (b) the filter logic may be further adapted to filter the unfiltered control signals in response to assertion of the second over-current signal such that the filtered control signals include at least one pulse that is not present in the unfiltered control signals.

(A8) In the DC-to-DC converter denoted as (A7), the control signal generator may include (a) error circuitry adapted to set a voltage at an error node as a function of a difference between an actual output voltage of the DC-to-DC converter and a desired output voltage of the DC-to-DC converter, (b) an impedance network electrically coupled between the error node and an integration node, (c) an integration subsystem adapted to integrate current flowing through the impedance network to generate a modulator control signal, and (d) a modulator adapted to generate the unfiltered control signals from at least the modulator control signal.

(A9) In the DC-to-DC converter denoted as (A8): the current sensing subsystem may include a current source adapted to inject into a current feedback node a current signal proportional to the current flowing through the energy storage inductor; and the over-current detection subsystem may include (a) one or more resistive devices electrically coupled between the integration node and the current feedback node, (b) a first comparison subsystem adapted to assert the first over-current signal if a voltage at the current feedback node meets a first threshold criterion, and (c) a second comparison subsystem adapted to assert the second over-current signal if a voltage at the current feedback node meets a second threshold criterion.

(A10) In the DC-to-DC converter denoted as (A9), the first comparison subsystem may include (a) a first voltage source electrically coupled between the error node and a first reference node, and (b) a first comparator adapted to assert the first over-current signal if a voltage at the current feedback node exceeds a voltage at the first reference node; and the second comparison subsystem may include (a) a second voltage source electrically coupled between the error node and a second reference node, and (b) a second comparator adapted to assert the second over-current signal if a voltage at the second reference node exceeds the voltage at the current feedback node.

(A11) In the DC-to-DC converter denoted as (A8): the current sensing subsystem may include a current source adapted to inject into a current feedback node a current signal proportional to the current flowing through the energy storage inductor; and the over-current detection subsystem may include (a) one or more resistive devices electrically coupled between the error node and the current feedback node, (b) a first comparison subsystem adapted to assert the first over-current signal if a voltage at the current feedback node meets a first threshold criterion, and (c) a second comparison subsystem adapted to assert the second over-current signal if a voltage at the current feedback node meets a second threshold criterion.

(A12) In the DC-to-DC converter denoted as (A11), the first comparison subsystem may include (a) a first voltage source electrically coupled between the error node and a first reference node, and (b) a first comparator adapted to assert the first over-current signal if a voltage at the current feedback node exceeds a voltage at the first reference node; and the second comparison subsystem may include (a) a second voltage source electrically coupled between the error node and a second reference node, and (b) a second comparator adapted to assert the second over-current signal if a voltage at the second reference node exceeds the voltage at the current feedback node.

(A13) In any of the DC-to-DC converters denoted as (A1) through (A12), the switching circuit may include a control switching device adapted to operate in its conductive state during each pulse of the filtered control signals.

(A14) In any of the DC-to-DC converters denoted as (A1) through (A13), the DC-to-DC converter may include a buck-type DC-to-DC converter.

(A15) In any of the DC-to-DC converters denoted as (A1) through (A14), the control signal generator may be further adapted to generate the unfiltered control signals to control the switching circuit to regulate one or more parameters selected from the group consisting of input voltage of the DC-to-DC converter, input current to the DC-to-DC converter, input power to the DC-to-DC converter, output voltage of the DC-to-DC converter, load current of the DC-to-DC converter, and output power of the DC-to-DC converter.

(B1) A controller for a DC-to-DC converter may include (a) a modulator adapted to generate unfiltered control signals for controlling a switching circuit of the DC-to-DC converter, (b) a current sensing subsystem adapted to sense current flowing through an energy storage inductor of the DC-to-DC converter, (c) an over-current detection subsystem adapted to assert a first over-current signal if a magnitude of positive current flowing through the energy storage inductor exceeds a first maximum permissible value, and (d) filter logic adapted to filter the unfiltered control signals to generate filtered control signals in response to assertion of the first over-current signal, such that respective widths of one or more pulses of the filtered control signals are less than respective widths of corresponding pulses of the unfiltered control signals.

(B2) In the controller denoted as (B1), (a) the over-current detection subsystem may be further adapted to assert a second over-current signal if a magnitude of negative current flowing through the energy storage inductor exceeds a second maximum permissible value, (b) the filter logic may be further adapted to filter the unfiltered control signals in response to assertion of the second over-current signal such that the filtered control signals include at least one pulse that is not present in the unfiltered control signals.

(B3) In either of the controller denoted as (B1) or (B2), the controller may be adapted to generate the unfiltered control signals to control the switching circuit to regulate one or more parameters selected from the group consisting of input voltage of the DC-to-DC converter, input current to the DC-to-DC converter, input power to the DC-to-DC converter, output voltage of the DC-to-DC converter, load current of the DC-to-DC converter, and output power of the DC-to-DC converter.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A DC-to-DC converter, comprising:
   a switching circuit;
   an energy storage inductor electrically coupled to the switching circuit; and
   a controller, including:
      a control signal generator adapted to generate unfiltered control signals to control the switching circuit, the control signal generator including:
         error circuitry adapted to set a voltage at an error node as a function of a difference between an actual output voltage of the DC-to-DC converter and a desired output voltage of the DC-to-DC converter,
         an impedance network electrically coupled between the error node and an integration node,
         an integration subsystem adapted to integrate current flowing through the impedance network to generate a modulator control signal, and
         a modulator adapted to generate the unfiltered control signals from at least the modulator control signal,
         the impedance network being electrically coupled in series with the error circuitry and the integration subsystem,
      a current sensing subsystem adapted to sense current flowing through the energy storage inductor,
      an over-current detection subsystem adapted to assert a first over-current signal if a magnitude of positive current flowing through the energy storage inductor exceeds a first maximum permissible value, and
      filter logic adapted to filter the unfiltered control signals to generate filtered control signals in response to assertion of the first over-current signal, such that respective widths of one or more pulses of the filtered control signals are less than respective widths of corresponding pulses of the unfiltered control signals.

2. The DC-to-DC converter of claim 1, wherein:
   the current sensing subsystem comprises a current source adapted to inject into a current feedback node a current signal proportional to the current flowing through the energy storage inductor; and
   the over-current detection subsystem comprises:
      one or more resistive devices electrically coupled between the integration node and the current feedback node, and
      a first comparison subsystem adapted to assert the first over-current signal if a voltage at the current feedback node meets a first threshold criterion.

3. The DC-to-DC converter of claim 2, the first comparison subsystem comprising:
   a first voltage source electrically coupled between the error node and a first reference node, and
   a first comparator adapted to assert the first over-current signal if a voltage at the current feedback node exceeds a voltage at the first reference node.

4. The DC-to-DC converter of claim 1, wherein:
   the current sensing subsystem comprises a current source adapted to inject into a current feedback node a current signal proportional to the current flowing through the energy storage inductor; and
   the over-current detection subsystem comprises:
      one or more resistive devices electrically coupled between the error node and the current feedback node, and
      a first comparison subsystem adapted to assert the first over-current signal if a voltage at the current feedback node meets a first threshold criterion.

5. The DC-to-DC converter of claim 4, the first comparison subsystem comprising:
   a first voltage source electrically coupled between the error node and a first reference node, and
   a first comparator adapted to assert the first over-current signal if a voltage at the current feedback node exceeds a voltage at the first reference node.

6. The DC-to-DC converter of claim 1, wherein:
   the over-current detection subsystem is further adapted to assert a second over-current signal if a magnitude of negative current flowing through the energy storage inductor exceeds a second maximum permissible value; and the filter logic is further adapted to filter the unfiltered control signals in response to assertion of the second over-current signal such that the filtered control signals include at least one pulse that is not present in the unfiltered control signals.

7. The DC-to-DC converter of claim 6, wherein:
the current sensing subsystem comprises a current source adapted to inject into a current feedback node a current signal proportional to the current flowing through the energy storage inductor; and
the over-current detection subsystem comprises:
  one or more resistive devices electrically coupled between the integration node and the current feedback node,
  a first comparison subsystem adapted to assert the first over-current signal if a voltage at the current feedback node meets a first threshold criterion, and
  a second comparison subsystem adapted to assert the second over-current signal if a voltage at the current feedback node meets a second threshold criterion.

8. The DC-to-DC converter of claim 7, wherein:
the first comparison subsystem comprises:
  a first voltage source electrically coupled between the error node and a first reference node, and
  a first comparator adapted to assert the first over-current signal if a voltage at the current feedback node exceeds a voltage at the first reference node; and
the second comparison subsystem comprises:
  a second voltage source electrically coupled between the error node and a second reference node, and
  a second comparator adapted to assert the second over-current signal if a voltage at the second reference node exceeds the voltage at the current feedback node.

9. The DC-to-DC converter of claim 6, wherein:
the current sensing subsystem comprises a current source adapted to inject into a current feedback node a current signal proportional to the current flowing through the energy storage inductor; and
the over-current detection subsystem comprises:
  one or more resistive devices electrically coupled between the error node and the current feedback node,
  a first comparison subsystem adapted to assert the first over-current signal if a voltage at the current feedback node meets a first threshold criterion, and
  a second comparison subsystem adapted to assert the second over-current signal if a voltage at the current feedback node meets a second threshold criterion.

10. The DC-to-DC converter of claim 9, wherein:
the first comparison subsystem comprises:
  a first voltage source electrically coupled between the error node and a first reference node, and
  a first comparator adapted to assert the first over-current signal if a voltage at the current feedback node exceeds a voltage at the first reference node; and
the second comparison subsystem comprises:
  a second voltage source electrically coupled between the error node and a second reference node, and
  a second comparator adapted to assert the second over-current signal if a voltage at the second reference node exceeds the voltage at the current feedback node.

11. The DC-to-DC converter of claim 1, the switching circuit comprising a control switching device adapted to operate in its conductive state during each pulse of the filtered control signals.

12. The DC-to-DC converter of claim 11, the DC-to-DC converter comprising a buck-type DC-to-DC converter.

13. The DC-to-DC converter of claim 12, the control signal generator further adapted to generate the unfiltered control signals to control the switching circuit to regulate one or more parameters selected from the group consisting of input voltage of the DC-to-DC converter, input current to the DC-to-DC converter, input power to the DC-to-DC converter, output voltage of the DC-to-DC converter, load current of the DC-to-DC converter, and output power of the DC-to-DC converter.

14. A DC-to-DC converter, comprising:
a switching circuit including a control switching device;
an energy storage inductor electrically coupled to the switching circuit at a switching node; and
a controller, including:
  a control signal generator adapted to generate unfiltered control signals to control the switching circuit such that (a) the switching circuit repeatedly switches the switching node between two different voltage levels and (b) an output voltage of the DC-to-DC converter is a function of a duty cycle of the control switching device,
  a current sensing subsystem adapted to sense current flowing through the energy storage inductor,
  an over-current detection subsystem adapted to assert an over-current signal if a magnitude of current flowing through the energy storage inductor exceeds a maximum permissible value, and
  filter logic adapted to filter the unfiltered control signals to generate filtered control signals in response to assertion of the over-current signal, such that the filtered control signals include at least one pulse that is not present in the unfiltered control signals,
the switching circuit and the controller adapted to operate the control switching device in its conductive state during each pulse of the filtered control signals, such that the control switching device operates in its conductive state in response to assertion of the over-current signal.

15. A controller for a DC-to-DC converter, comprising:
a modulator adapted to generate unfiltered control signals for controlling a switching circuit of the DC-to-DC converter;
a current sensing subsystem adapted to sense current flowing through an energy storage inductor of the DC-to-DC converter;
an over-current detection subsystem adapted to assert a first over-current signal if a magnitude of positive current flowing through the energy storage inductor exceeds a first maximum permissible value;
filter logic adapted to filter the unfiltered control signals to generate filtered control signals in response to assertion of the first over-current signal, such that respective widths of one or more pulses of the filtered control signals are less than respective widths of corresponding pulses of the unfiltered control signals;
error circuitry adapted to set a voltage at an error node as a function of a difference between an actual output voltage of the DC-to-DC converter and a desired output voltage of the DC-to-DC converter;
an impedance network electrically coupled between the error node and an integration node;

an integration subsystem adapted to integrate current flowing through the impedance network to generate a modulator control signal; and a modulator adapted to generate the unfiltered control signals from at least the modulator control signal;

the impedance network being electrically coupled in series with the error circuitry and the integration subsystem.

16. The controller of claim 15, wherein:

the over-current detection subsystem is further adapted to assert a second over-current signal if a magnitude of negative current flowing through the energy storage inductor exceeds a second maximum permissible value; and the filter logic is further adapted to filter the unfiltered control signals in response to assertion of the second over-current signal such that the filtered control signals include at least one pulse that is not present in the unfiltered control signals.

17. The controller of claim 16, the controller adapted to generate the unfiltered control signals to control the switching circuit to regulate one or more parameters selected from the group consisting of input voltage of the DC-to-DC converter, input current to the DC-to-DC converter, input power to the DC-to-DC converter, output voltage of the DC-to-DC converter, load current of the DC-to-DC converter, and output power of the DC-to-DC converter.

18. A method for providing over-current protection in a DC-to-DC converter, comprising:

setting a voltage at an error node as a function of a difference between an actual output voltage of the DC-to-DC converter and a desired output voltage of the DC-to-DC converter;

electrically coupling current from the error node to an integration node via an impedance network separating the error node and the integration node;

integrating current flowing through the impedance network to generate a modulator control signal on a node separate from the error node and the integration node;

generating unfiltered control signals in response to the modulator control signal to control a switching circuit of the DC-to-DC converter;

sensing current flowing through an energy storage inductor of the DC-to-DC converter;

determining whether a magnitude of current flowing through the energy storage inductor exceeds a maximum permissible value;

asserting an over-current signal if the magnitude of current flowing through the energy storage inductor exceeds the maximum permissible value; and in response to assertion of the over-current signal, filtering the unfiltered control signals to generate filtered control signals such that respective widths of one or more pulses of the filtered control signals are less than respective widths of corresponding pulses of the unfiltered control signals.

19. A method for providing over-current protection in a DC-to-DC converter, comprising:

generating unfiltered control signals to control a switching circuit of the DC-to-DC converter to cause the switching circuit to repeatedly switch a switching node of the DC-to-DC converter between two different voltage levels, such that an output voltage of the DC-to-DC converter is a function of a duty cycle of a control switching device of the switching circuit;

sensing current flowing through an energy storage inductor of the DC-to-DC converter, the energy storage inductor coupled to the switching node;

determining whether a magnitude of current flowing through the energy storage inductor exceeds a maximum permissible value;

asserting an over-current signal if the magnitude of current flowing through the energy storage inductor exceeds the maximum permissible value;

in response to assertion of the over-current signal, filtering the unfiltered control signals to generate filtered control signals such that the filtered control signals include at least one pulse that is not present in the unfiltered control signals; and operating the control switching device in its conductive state during each pulse of the filtered control signals, such that the control switching device operates in its conductive state in response to assertion of the over-current signal.

* * * * *